(12) United States Patent
Li et al.

(10) Patent No.: US 10,929,251 B2
(45) Date of Patent: Feb. 23, 2021

(54) DATA LOSS PREVENTION FOR INTEGRATED MEMORY BUFFER OF A SELF ENCRYPTING DRIVE

(71) Applicant: Intel Corporation, Santa Clara, CA (US)

(72) Inventors: Peng Li, Beaverton, OR (US); David J. Pelster, Longmont, CO (US); Gamil Cain, El Dorado Hills, CA (US); Ryan J. Norton, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 16/370,644

(22) Filed: Mar. 29, 2019

(65) Prior Publication Data
US 2019/0227884 A1   Jul. 25, 2019

(51) Int. Cl.
| | |
|---|---|
| *G06F 11/00* | (2006.01) |
| *G06F 11/14* | (2006.01) |
| *G06F 3/06* | (2006.01) |
| *G06F 11/30* | (2006.01) |
| *G06F 12/14* | (2006.01) |

(52) U.S. Cl.
CPC ........ *G06F 11/1469* (2013.01); *G06F 3/0619* (2013.01); *G06F 3/0656* (2013.01); *G06F 3/0679* (2013.01); *G06F 11/1471* (2013.01); *G06F 11/3034* (2013.01); *G06F 11/3058* (2013.01); *G06F 12/1408* (2013.01)

(58) Field of Classification Search
CPC . G06F 11/1471; G06F 2212/407; G06F 12/14
See application file for complete search history.

(56) References Cited

U.S. PATENT DOCUMENTS

| | | | |
|---|---|---|---|
| 8,364,887 B2 * | 1/2013 | Wong | G06F 11/1402 |
| | | | 711/103 |
| 8,645,716 B1 * | 2/2014 | Dujari | G06F 21/71 |
| | | | 713/193 |
| 9,870,481 B1 * | 1/2018 | Lazar | G06F 21/6218 |
| 9,875,189 B2 * | 1/2018 | Zmudzinski | G06F 12/1027 |
| 10,643,668 B1 * | 5/2020 | Poudyal | G11B 19/04 |

(Continued)

OTHER PUBLICATIONS

Intel Solid-State Drive Professional Family, "Opal Activation Time Variations", Intel Solid State Drives Technology Brief, 2 pages, Oct. 14, 2014.

(Continued)

*Primary Examiner* — Jonathan D Gibson
(74) *Attorney, Agent, or Firm* — Compass IP Law PC

(57) ABSTRACT

A solid state drive (SSD) includes a nonvolatile memory array and a cache memory. The nonvolatile memory array has an encrypted integrated memory buffer (IMB) space. The cache memory has a decrypted copy of the IMB and an encrypted backup copy of the IMB. In power loss recovery (PLR) after a power loss imminent (PLI) event, the SSD can determine whether to recover the unencrypted copy of the IMB or the backup encrypted copy. The backup encrypted copy can reduce the risk of loss of data in the IMB in the event that multiple PLI events occur and a corrupted copy of the IMB is used to overwrite the IMB in the nonvolatile memory during a previous PLR.

20 Claims, 6 Drawing Sheets

(56) References Cited

U.S. PATENT DOCUMENTS

| | | | |
|---|---|---|---|
| 2006/0005048 A1* | 1/2006 | Osaki | G06F 11/1458 |
| | | | 713/193 |
| 2014/0101378 A1 | 4/2014 | Olbrich et al. | |
| 2014/0223231 A1* | 8/2014 | Mangold | G11C 16/16 |
| | | | 714/22 |
| 2016/0246530 A1* | 8/2016 | Mylavarapu | G06F 3/0616 |
| 2017/0139626 A1* | 5/2017 | Wakchaure | G11C 11/5628 |
| 2018/0285260 A1* | 10/2018 | Lu | G06F 12/0891 |
| 2019/0042098 A1 | 2/2019 | Li et al. | |
| 2019/0042152 A1 | 2/2019 | Trika et al. | |
| 2019/0042153 A1 | 2/2019 | Khan et al. | |
| 2019/0042460 A1 | 2/2019 | Trika et al. | |
| 2019/0042571 A1 | 2/2019 | Li et al. | |
| 2019/0087331 A1* | 3/2019 | Lappi | G06F 11/366 |
| 2019/0227884 A1* | 7/2019 | Li | G06F 3/0656 |
| 2020/0066367 A1* | 2/2020 | Lingambudi | G11C 29/52 |
| 2020/0250107 A1* | 8/2020 | Kazi | G06F 12/126 |

OTHER PUBLICATIONS

Micron, "How Micron SSDs Handle Unexpected Power Loss", A Micron White Paper, 4 pages, Feb. 2015.

Trusted Computing Group and NVM Express Joint White Paper: "TCG Storage, Opal, and NVMe", published Aug. 2015, 11 pages.

* cited by examiner

DATA LOSS PREVENTION FOR INTEGRATED MEMORY BUFFER OF A SELF ENCRYPTING DRIVE

FIELD

Descriptions are generally related to storage devices, and more particular descriptions relate to power loss recovery for an integrated memory buffer (IMB) of a self-encrypting drive.

BACKGROUND

Some storage devices or drives include designated spaces in the nonvolatile storage array that are encrypted at rest. Data encrypted at rest refers to encrypting data when stored on the nonvolatile storage media, but is not necessarily encrypted in flight, or when transmitted. The encrypted data is typically decrypted in the data cache for use by the system. In a storage device that includes both nonvolatile storage and a cache for the nonvolatile storage, the data can be modified in the cache memory and then committed back to the nonvolatile media.

In a storage device that includes power loss detection, there can be situations where the system attempts to restore invalid data. Sometimes after a power loss the decrypted copy of the data is valid and sometimes the encrypted data is still the valid data. If another power loss occurs during a data recovery procedure after the previous power loss, it may not be clear which copy of the data is valid. If it is unclear which copy is valid, the system could inadvertently overwrite the valid data.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
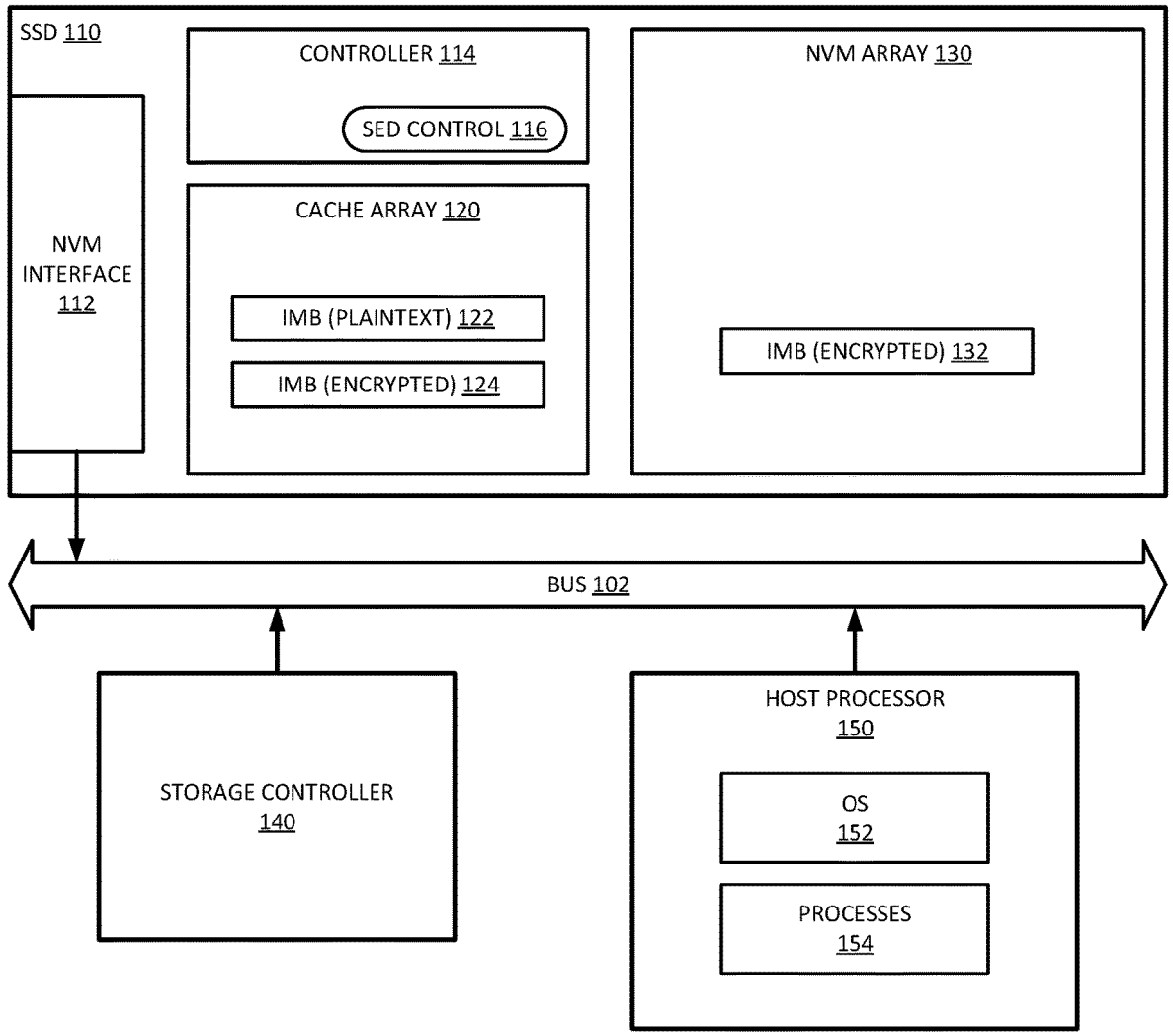
FIG. 1 is a block diagram of an example of a self-encrypting drive with a backup integrated memory buffer.

Descriptions of certain details and implementations follow, including non-limiting descriptions of the figures, which may depict some or all examples, and well as other potential implementations.

DETAILED DESCRIPTION

As described herein, a storage device such as a solid state drive (SSD) includes a nonvolatile memory array and a cache memory. The nonvolatile memory array has an encrypted integrated memory buffer (IMB) space. An IMB refers to a designated memory space. The designated memory space can be defined by an address range, and the memory space is designated for a specific purpose or for a specific type of data. As described herein, the IMB can be used for encrypted data. It will be understood that the nonvolatile storage array can have more than one IMB, and each IMB can be separately managed.

The storage device includes a cache memory or a buffer memory to buffer data between the storage device and a host device. The cache memory includes a decrypted copy of the IMB. In one example, the cache memory includes an encrypted backup copy of the IMB. In power loss recovery (PLR), the SSD will always load the encrypted copy of the IMB from the nonvolatile storage array to the cache memory and decrypt it. In a power loss imminent (PLI) event, the SSD can determine whether to (1) encrypt the unencrypted copy of the IMB and save it to nonvolatile storage array or (2) save the backup encrypted copy to the nonvolatile storage array directly. A PLI event refers to a detection of power loss, where in response to the detection of power loss, the system performs operations to transfer data from the cache memory to the nonvolatile storage array prior to a full loss of power to the device.

The backup encrypted copy can reduce the risk of loss of data in the IMB in the event that multiple PLI events occur and a corrupted copy of the IMB is used to overwrite the IMB in the nonvolatile memory during a previous PLR. If a PLI event causes a storage device to write its IMB contents to nonvolatile storage, the copy on disk will end up overwriting the previous copy of the IMB. However, if the PLI event occurs during decryption, or if there is some other corruption, then the contents copied to the nonvolatile storage could be an improper copy of the IMB. By having a backup copy of the IMB, the device can restore the IMB by selecting from among the decrypted copy and the encrypted copy, based on a determination of which copy is the copy that should be used.

In one example, the drive implementing the backup IMB space is a drive with any encrypted space. In one example, the drive implementing the backup IMB space is a self encrypting drive (SED). A self encrypting drive refers to a drive that includes a hardware engine to implement disk encryption. Such disk encryption is independent of the host operating system (OS), and is thus usable with any OS. With an SED, the drive itself includes encryption keys and a controller to implement the encryption and decryption. An SED drive will have a cache or buffer memory to store a decrypted copy of contents between the host and the nonvolatile memory.

In one example, the SED drive implements an OPAL based protocol. Opal refers to a hardware based hard drive standard developed by the TRUSTED COMPUTING GROUP (TCG). The Opal standard is in the form of Opal Security Subsystem Class, typically referred to simply as "Opal", and is used for applying hardware-based encryption to hard drives (rotating media), solid state drives (SSDs), and optical drives. All trademarks are the property of their respective owners and are used herein solely for purposes of identification. Reference herein to Opal can refer to the specific standard. It will be understood that other standards for hardware-based disk encryption could be applied in place of Opal. Thus, reference to an Opal-enabled drive or an Opal-enabled memory space can refer to a drive or memory space controlled by a controller that implements Opal, and can be understood to apply or extend to a controller that implements another hardware encryption technique, including proprietary implementations.

FIG. 1 is a block diagram of an example of a self-encrypting drive with a backup integrated memory buffer. System 100 includes solid state drive (SSD) 110 coupled to storage controller 140 and host processor 150 via bus 102. Storage controller 140 represents a controller to manage data access for SSD 110. Data access can include writing data to SSD 110 or reading data from SSD 110, or a combination of reading and writing data.

Host processor 150 represents a processor or processing unit of a computing system in which SSD 110 is incorporated. Host processor 150 executes commands that generate requests for data access to SSD 110. Collectively the processor and applications and processes it executes can be referred to as the host. Host processor 150 can include a central processing unit (CPU), a primary controller, a graphics processing unit (GPU), or other processor device. In one example, host processor 150 can include one or more separate processors. Each separate processor can include a single processing unit, a multicore processing unit, or a combination.

In one example, host processor 150 executes a host operating system (OS) 152, when processor 150 represents a primary processor. Host processor 150 executes one or more processes 154, which represent routines that can generate data access requests. Processes 154 can include software programs, system processes, firmware, or other logic for execution by a processor. In one example, storage controller 140 is part of host processor 150.

Bus 102 includes multiple signal lines to couple components together. A bus can refer to a logical grouping of signal lines or interconnect lines. Coupling of components can include communicative coupling to enable communication between components. Coupling can include electrical coupling to enable electrical interconnection. Bus 102 can represent one or more buses, which can include physical communication lines, point-to-point connections, bridges, adapters, controllers, or other circuitry or a combination.

SSD 110 includes NVM interface 112, referred to as interface 112. Interface 112 represents hardware and software/firmware components to interface with bus 102 in accordance with one or more interface protocols. SSD 110 can implement one or more of various interconnections, such as PCIe (peripheral component interconnect express) or NVMe (nonvolatile memory express). In one example, interface 112 represents a PCIe interface. PCIe can be, for example, in accordance with PCI Express Base Specification Revision 4.0, Version 1.0, released Oct. 5, 2017 by PCI-SIG, or other specification, or a variant. In one example, interface 112 represents an NVMe interface. NVMe can be, for example, in accordance with NVM Express, Revision 1.3a, released Oct. 24, 2017, by the NVM Express, Inc., or other specification, or a variant.

Bus 102 supports at least one interface for access to SSD 110 for access to nonvolatile storage. SSD 110 is specifically identified as a solid state drive, but can be consistent with another type of nonvolatile storage device. SSD 110 includes controller 114, which represents a controller within the storage device. Controller 114 provides management and control of SSD 110. Controller 114 represents a controller to manage interface 112 to implement an interface protocol. In one example, controller 114 implements SED control 116. In one example, SED control 116 represents an implementation of Opal. Traditionally Opal is only applied to spaces in the nonvolatile array. As described herein, a similar encryption protection is provided for cache array 120. Opal is one nonlimiting example, and any variation of encryption could be applied to SSD 110 and the use of encrypted and unencrypted spaces used in the cache array.

In an implementation of encrypted space, either full disk encryption (FDE) such as used in an SED, or for an encrypted portion, controller 114 waits for a user input key to allow unlocking of the encrypted portion. For example, a user will have a password or other secure input, and the device itself provides the key needed to decrypt the encrypted space.

SSD 110 includes NVM (nonvolatile memory) array 130, which represents an array of nonvolatile storage media. The nonvolatile media can be any type of nonvolatile media, such as Flash memory, or any of a number of resistive-based storage technologies. The Flash memory can be or include and array of NAND (not AND) or NOR (not OR) storage cells. In one example, NVM array 130 includes single level cell (SLC). In one example, NVM array 130 includes a multilevel cell (MLC).

SSD 110 includes cache array 120, which represents a cache memory within SSD 110. Cache array 120 can buffer incoming data for writes to NVM array 130. Cache array 120 can buffer outgoing data responsive to read from NVM array 130. In one example, cache array 120 represents a dynamic random access memory (DRAM) array. Alternatively, cache array 120 can be or include other volatile memory cells. A volatile memory cell needs to be refreshed to maintain a deterministic state. A nonvolatile memory maintains state even if power is interrupted to the array. In one example, cache array 120 can be or include nonvolatile memory as a buffer for access to NVM array 130. For example, cache array 120 can include resistive-based memory that stores data based on a resistive state of the bitcell. As another example, cache array 120 can include SLC Flash, while NVM array 130 includes MLC Flash.

In one example, the IMB is a DRAM-based NVMe namespace. Such an IMB would have fine access granularity (e.g., 32B access granularity), low latency (e.g., approximately 10 us (microsecond)), and virtually-infinite endurance. An alternative implementation in certain resistive-based three-dimensional crosspoint (3DXP) memory have comparable access granularity, latency, and endurance much higher than Flash memory. Cache array 120 includes a plaintext or not encrypted copy of the IMB data, as represented by IMB 122. IMB 122 can be read and written by host processor 150 during runtime. Runtime refers to active operation of system 100, as compared to when the device is in low power mode or shut down. In one example, IMB 122 will only be encrypted and saved in NVM array 130 as IMB 132 during power cycle, such as reboot, clean shutdown, or surprise power loss.

In one example, SSD 110 includes hardware-based encryption, whether encryption of portions of the storage space, or full-disk encryption (FDE). In a hardware implementation, the computational load of the encryption process is executed by dedicated logic within SSD 110. In one example, controller 114 is or includes hardware logic to perform encryption/decryption operations. The hardware logic can be referred to as a hardware engine for encryption/ decryption, where the hardware stores the keys (e.g., in storage controlled by controller 114), without the keys ever being moved to system memory (not specifically shown). The hardware engine performs the operations traditionally performed by software-based encryption, which traditionally loads host processor 150.

In one example of an Opal-enabled IMB, or other IMB complying with an FDE standard, SSD 110 will not load the IMB from NVM array 130 and decrypt it until the namespace is unlocked by an administrator. Prior to the unlock operation, IMB 122 has invalid data. In case there is another power cycle, the traditional operation will be that the invalid data will be encrypted and saved to NVM array 130 as IMB 132. In such a case, the actual data in the IMB namespace will be lost. It will be understood that skipping the IMB encryption and save during PLR if the data is invalid, the system will not always be able to determine which PLI dump has the latest valid IMB data, or whether there are any existing PLI dumps that have the latest valid IMB data in case of nested PLI events.

As illustrated, cache array 120 includes IMB 124, which is an encrypted copy of the IMB data loaded from NVM array 130. In one example, controller 114 loads encrypted copy IMB 124 during PLR as a backup copy. It will be understood that controller 114 will execute PLR in response to a PLI event. If another PLI event occurs during PLR or after a previous PLI and prior to a full restore, in one example, SSD 110 decides which IMB region should be save to NMV array 130. The SSD deciding which IMB region to save to NVM array 130 can refer to controller 114 performing one or more operations to determine which IMB region in cache array 120 is the valid copy. In one example, SSD 110 saved the copy of the IMB space to NVM array 130 based on an indicator that can represent validity of the IMB region or memory space. In one example, the SSD saves the IMB region based on a PLR state associated with the IMB.

In one example, cache array 120 is carved up into different ranges of addresses that can be separately locked and unlocked. A logically organized range of addresses can be referred to as a namespace. Thus, cache array 120 can include multiple namespaces. In one example, cache array 120 can include eight ranges that can each have a separate password. In one example, an IMB is associated with one of the available ranges. When encrypted space is used, SSD 110 can encrypt and record the IMB data to nonvolatile memory in response to a PLI event. When the drive comes back up, controller 114 will await a user password to unlock the IMB prior to allowing access to the space.

While not specifically illustrated in system 100, it will be understood that system 100 includes PLI circuitry to indicate a PLI event to controller 114. In one example, the PLI circuitry is within SSD 110. In one example, the PLI circuitry that triggers a PLI event for controller 114 is located outside SSD 110 in system 100.

Cache array 120 can be or include a memory device, which can be either volatile memory or nonvolatile memory. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, JESD79, initial specification published in September 2012 by JEDEC), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, currently in discussion by JEDEC), LPDDR5 (currently in discussion by JEDEC), HBM2 ((HBM version 2), currently in discussion by JEDEC), or others or combinations of memory technologies, and technologies based on derivatives or extensions of such specifications.

Examples of nonvolatile memory can include block addressable memory, such as NAND or NOR technologies. Nonvolatile memory can include byte addressable nonvolatile memory devices. Byte addressable nonvolatile memory can include resistive-based memory. Resistive based memory can include chalcogenide phase change material (e.g., chalcogenide glass) as a phase change memory (PCM) or phase change memory with a switch (PCMS), ferroelectric transistor random access memory (FeTRAM), magnetoresistive random access memory (MRAM) memory that incorporates memristor technology, or spin transfer torque (STT)-MRAM, or a combination of any of the above, or other memory.

In one example, cache array 120 has faster access than NVM array 130. In one example, NVM array 130 is or includes nonvolatile memory such as any of those described in the preceding paragraph. In such an example, cache array 120 could be implemented as volatile memory (e.g., DRAM) or as another nonvolatile memory device.

Figure 2:
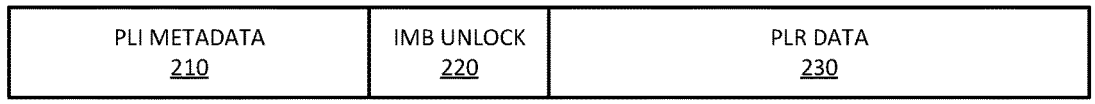
FIG. 2 is a representation of an example of a power loss recovery data structure including a flag to indicate whether an integrated memory buffer is unlocked.

FIG. 2 is a representation of an example of a power loss recovery data structure including a flag to indicate whether an integrated memory buffer is unlocked. PLR data structure 200 represents an example of a data structure for an IMB or other encrypted data space in a nonvolatile storage device such as SSD 110 of system 100.

In one example, PLR data structure 200 includes a PLR header stored in plaintext. The PLR header can be included in PLR data 230. In one example, PLR data 230 can indicate metadata for performing recovery operations after a data loss. In one example, PLR data structure 200 includes PLI metadata 210, which can indicate operations to perform in response to a PLI event, or configuration for PLI event response.

In one example, PLR data structure 200 includes IMB unlock indicator 220. Indicator 220 can be referred to as an unlock flag. In one example, a storage device controller accesses IMB unlock indicator 220 to determine if the copy of the IMB in a cache memory is unlocked. Depending on the determination, the controller can decide which copy to record in the nonvolatile storage or the primary storage array of the nonvolatile storage device.

In one example, the allocation for encrypted IMB data is as follows. First the controller allocates a separate cache region to load the encrypted IMB data without decryption from the nonvolatile storage during power up. In one example, the operation is performed during an early stage of the SSD recovery flow or PLR. In one example, the controller loads PLI metadata, such as PLI header, footer, completer, and other PLI data. PLI metadata 210 can represent such PLI metadata. If a PLI event occurs during the PLR flow, the existing SSD methodology will ensure all the data can be recovered, including the IMB data.

In one example, PLI data and metadata are loaded and restored based on IMB unlock 220. In one example, IMB unlock 220 represents a Boolean variable added to an existing PLR data structure to track whether or not the IMB namespace has been unlocked. In one example, IMB unlock 220 is more than a single Boolean bit. In one example, the controller does not update the value of IMB unlock 220 until the associated or corresponding IMB namespace is unlocked and all its data has been decrypted to the corresponding cache region. It will be understood that PLR data structure 200 can be associated with one IMB space.

In one example, the controller can prevent data loss while supporting the encryption for the IMB namespace with allocation of an encrypted copy of the IMB data in the cache array. The encrypted copy can be referred to as a backup copy of the IMB data. In case another PLI event happens before the IMB namespace is unlocked, the controller can restore the encrypted IMB data which is valid, instead of the decrypted IMB data which is invalid. In one example, the controller executing the SSD firmware will save different cached regions based on validity of the data. For example, if the IMB namespace is unlocked, the controller will record the unencrypted data to nonvolatile memory, and otherwise will record the encrypted copy of the data.

Figure 3A:
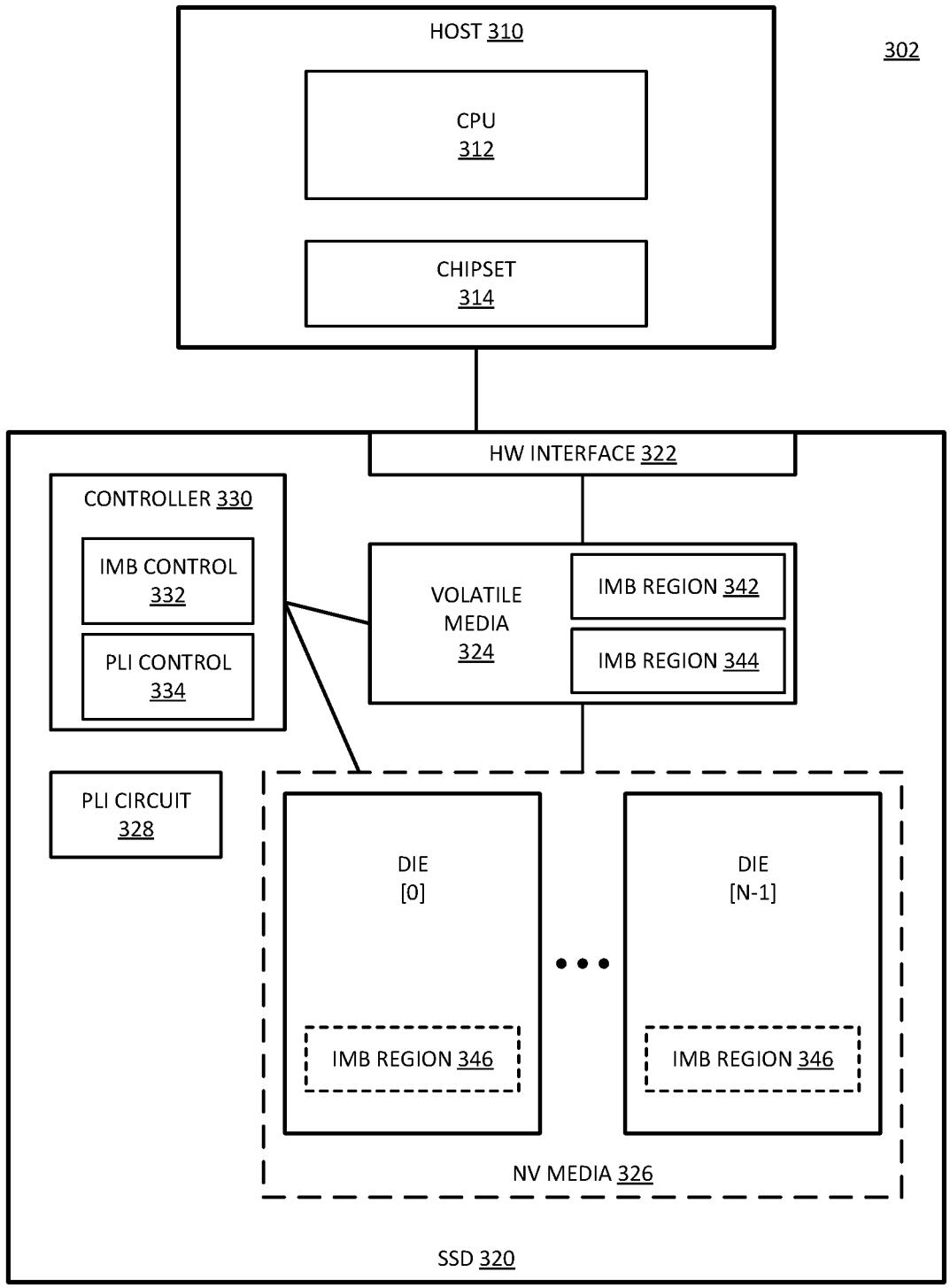
FIG. 3A is a block diagram of an example of a system with a solid state drive (SSD) with power loss imminent control circuitry and control logic.

FIG. 3A is a block diagram of an example of a system with a solid state drive (SSD) with power loss imminent control circuitry and control logic. System 302 represents components consistent with system 100 of FIG. 1. System 302 includes SSD 320 coupled with host 310. Host 310 represents a host hardware platform that connects to SSD 320. Host 310 includes CPU (central processing unit) 312 or other processor as a host processor. CPU 312 represents any host processor that generates requests to access data stored on 320, either to read the data or to write data to the storage. Such a processor can include a single or multicore processor, a primary processor for a computing device, a graphics processor, a peripheral processor, or a supplemental or auxiliary processor, or a combination. CPU 312 can execute a host OS and other applications to cause the operation of system 302.

Host 310 includes chipset 314, which represents hardware components that can be included in connecting between CPU 312 and SSD 320. For example, chipset 314 can include interconnect circuits and logic to enable access to SSD 320. Thus, host platform 310 can include a hardware platform drive interconnect to couple SSD 320 to host 310. Host 310 includes hardware to interconnect to the SSD. Likewise, SSD 320 includes corresponding hardware to interconnect to host 310. In one example, chipset 314 includes a storage controller, which is a host-side controller that is separate from controller 330 within SSD 320.

SSD 320 represents a solid-state drive that includes two types of nonvolatile (NV) media to store data. SSD 320 includes HW (hardware) interface 322 represents hardware components to interface with host 310. For example, HW interface 322 can interface with one or more buses to implement a high speed interface standard such as NVMe or PCIe.

In one example, SSD 320 includes volatile media 324, such as a DRAM. Volatile media 324 can operate as a buffer or cache for SSD 320. SSD 320 includes NV (nonvolatile) media 326 as the primary storage for SSD 320. In one example, NV media 326 is implemented as multiple dies, illustrated as N dies, Die[0: {N−1}]. N can be any number of devices, and is often a binary number.

In one example, volatile media 324 includes IMB region 342, representing an unencrypted region of space, being unencrypted for use in active operation of system 302. IMB region 344 represents a backup encrypted copy of region 342. It will be understood that in one example, IMB region 344 does not exist in volatile media 324 until a PLR operation causes the controller to create the backup copy of the encrypted space.

IMB region 342 and region IMB 344 correspond to IMB region 346 of NV media 326. It will be understood that if IMB region 346 is an address range, the distribution of the IMB region across the various components of the NV media will depend on the implementation of NV media 326. For example, the entire space could be located in a single die. In another example, the space could be separated or striped across multiple dies. While not shown as multiple devices, it will be understood that IMB regions 342 and 344 could also be stored across multiple memory dies.

SSD 320 includes controller 330 to control access to volatile media 324 and NV media 326. Controller 330 represents hardware and control logic within SSD 320 to execute control over the media. In one example, included in the control of controller 330 is IMB control 332, which enables controller 330 to manage IMB spaces. IMB control 332 can read metadata associated with the IMB space, including PLR metadata and PLI metadata. In one example, PLI control 334 is included in control of controller 330. PLI control 334 represents logic to enable controller 330 to perform operations related to responding to a PLI event. For example, PLI control 334 can enable controller 330 to determine which version or copy of IMB space to restore to NV media 326 during a PLR. PLI control 334 operates responsive to detection of a PLI event by PLI circuit 328.

In one example, SSD 320 includes PLI circuit 328, which represents circuitry to detect an imminent power loss. In one example, in response to a PLI event, controller 330 causes the IMB stored in volatile media 324 to NV media 326. Controller 330 can determine which copy of the IMB region to store in NV media 326. For example, controller 330 can store the copy of the IMB that represents valid data during a PLR.

Figure 3B:
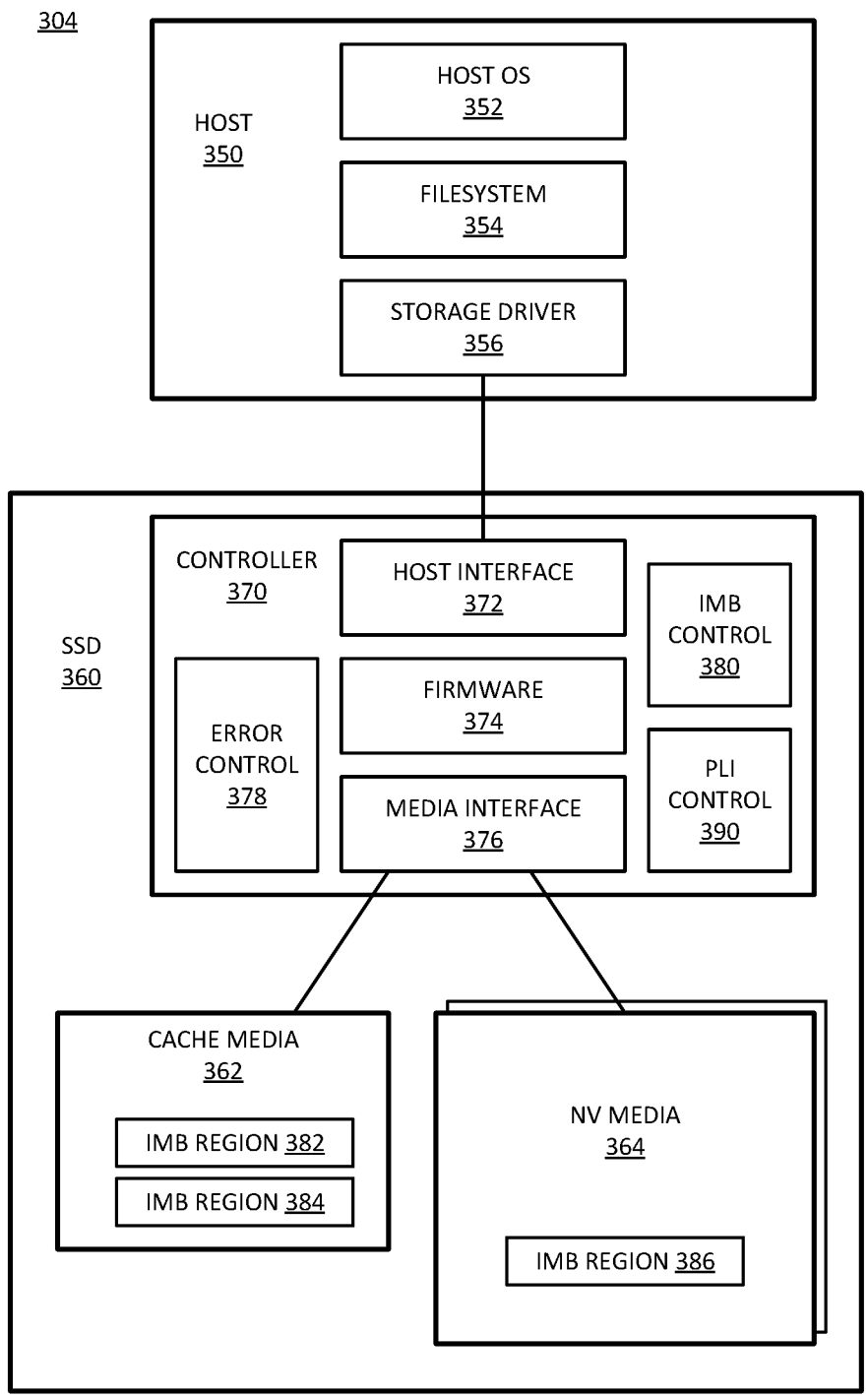
FIG. 3B is a block diagram of an example of a system with a solid state drive (SSD) with power loss imminent control, including control of a backup integrated memory buffer for power loss recovery.

FIG. 3B is a block diagram of an example of a system with a solid state drive (SSD) with power loss imminent control, including control of a backup integrated memory buffer for power loss recovery. System 304 provides one example of a system in accordance with system 302 of FIG. 3A. System 304 illustrates the logical layers of the host and SSD of a hardware platform in accordance with system 302. System 304 can represent software and firmware components of an example of system 302, as well as physical components. In one example, host 350 provides one example of host 310. In one example, SSD 360 provides one example of SSD 320.

In one example, host 350 includes host OS 352, which represents a host operating system or software platform for the host. Host OS 352 can include a platform on which applications, services, agents, and/or other software executes, and is executed by a processor. Filesystem 354 represents control logic for controlling access to the NV media. Filesystem 354 can manage what addresses or memory locations are used to store what data. There are numerous filesystems known, and filesystem 354 can implement known filesystems or other proprietary systems. In one example, filesystem 354 is part of host OS 352.

Storage driver 356 represents one or more system-level modules that control the hardware of host 350. In one example, drivers 356 include a software application to control the interface to SSD 360, and thus control the hardware of SSD 360. Storage driver 356 can provide a communication interface between the host and the SSD.

Controller 370 of SSD 360 includes firmware 374, which represents control software/firmware for the controller. In one example, controller 370 includes host interface 372, which represents an interface to host 350. In one example, controller 370 includes media interface 376, which represents an interface to cache media 362 and NV media 364. Media interface 376 represent control that is executed on hardware of controller 370. It will be understood that controller 370 includes hardware to interface with host 350, which can be considered to be controlled by host interface software/firmware 374. Likewise, it will be understood that controller 370 includes hardware to interface with NV media 364. In one example, code for host interface 372 can be part of firmware 374. In one example, code for media interface 376 can be part of firmware 374.

In one example, controller 370 includes error control 378 to handle data errors in accessed data, and corner cases in terms of compliance with signaling and communication interfacing. Error control 378 can include implementations in hardware or firmware, or a combination of hardware and software.

Cache media 362 represents a cache or buffer in accordance with any example herein. NV media 364 represents nonvolatile primary storage in accordance with any example herein. In one example, cache media 362 includes IMB region 382, which represents an unencrypted region of space, being unencrypted for use in active operation of system 304. IMB region 384 represents a backup encrypted copy of region 382. In one example, IMB region 384 does not exist in cache media 362 until a PLR operation causes the controller to create the backup copy of the encrypted space. IMB region 382 and region IMB 384 correspond to IMB region 386 of NV media 364.

Controller 370 includes IMB control 380 to control the IMB spaces in cache media 362 and NV media 364. IMB control 380 can read metadata associated with the IMB space, including PLR metadata and PLI metadata. In one example, PLI control 390 is included in control of controller 370. PLI control 390 represents logic to enable controller 370 to perform operations related to responding to a PLI event. For example, PLI control 390 can enable controller 370 to determine which version or copy of IMB space to restore to NV media 364 during a PLR.

Figure 4:
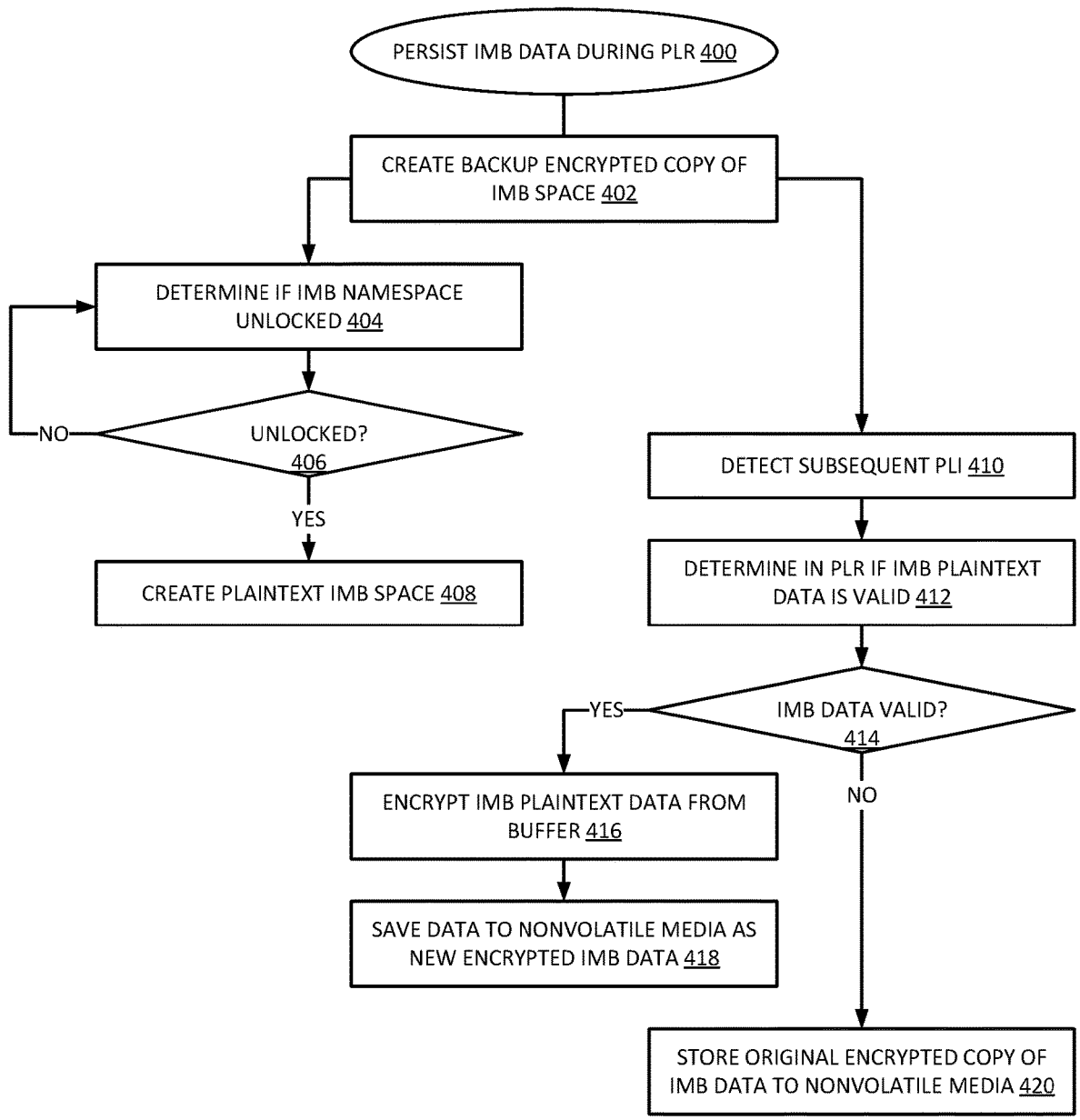
FIG. 4 is a flow diagram of an example of a process for persisting integrated memory buffer data during power loss recovery.

FIG. 4 is a flow diagram of an example of a process for persisting integrated memory buffer data during power loss recovery. Process 400 provides an example of a process flow for persisting IMB data during PLR using a backup copy of the IMB data in cache.

In one example, as part of PLR, the system creates a backup, encrypted copy of the IMB space in the cache, at 402. In one example, the system determines if the IMB namespace in the cache is unlocked, at 404. Once unlocked, in one example, the SSD will start to decrypt the IMB data, and will set IMB Unlock bit (for example, IMB unlock 220 of PLR data structure 200) to TRUE only when the decryption process is completed successfully. Thus, one implementation is that locked data is not valid and unlocked data is valid. In one example, the system determines that the IMB namespace is unlocked, at 406 YES branch, the system creates a plaintext/decrypted IMB space, at 408. The system can perform the operations through a controller of the SSD that manages the storage space and the cache that store the IMB spaces. If the system determines the namespace is still locked, at 406 NO branch, the system will not perform any decryption operation until an unlock command is received.

Detection of a PLI event and processing of the PLI event for a cache with a backup copy of the IMB data can occur as a parallel process to the determination to create a plaintext copy of the IMB data space. In response to detection of a subsequent PLI event prior to completion of the PLR, at 410, the system can determine in the PLR if the IMB plaintext data is valid, at 412. If the data is valid, at 414 YES branch, in one example the system encrypts the IMB plaintext data from the buffer, at 416. The system can then save the IMB data to nonvolatile media as new encrypted IMB data, at 418, where the stored encrypted IMB data enables recovery and restoration based on the original, encrypted IMB data.

In one example, if the IMB data is not valid, at 414 NO branch, in one example, the system stores the original encrypted copy of the IMB data to the nonvolatile media 420. Thus, the backup copy becomes the valid copy of the IMB data in the nonvolatile media.

Figure 5:
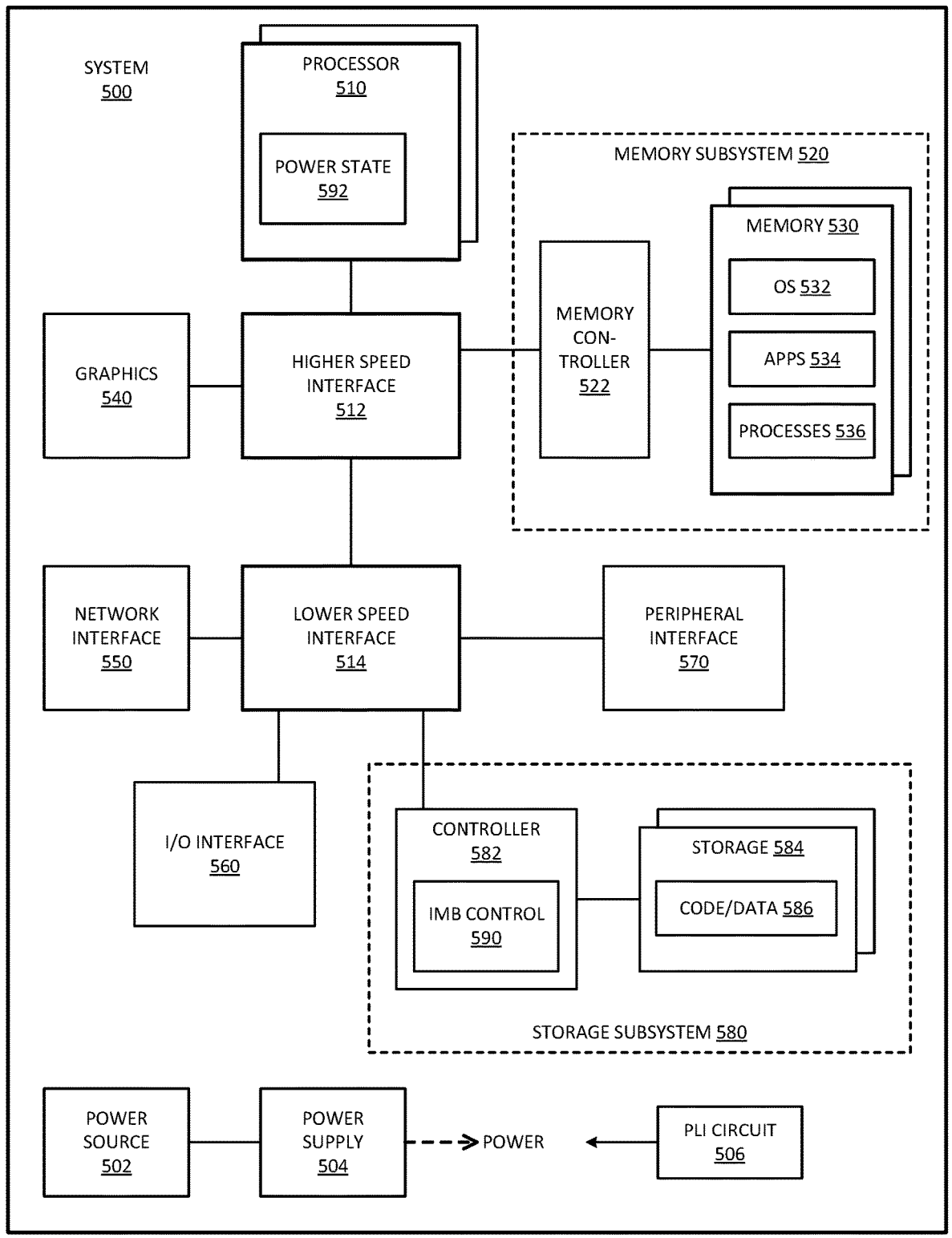
FIG. 5 is a block diagram of an example of a computing system with a solid state drive with a backup integrated memory buffer can be implemented.

FIG. 5 is a block diagram of an example of a computing system with a solid state drive with a backup integrated memory buffer can be implemented. System 500 represents a computing device in accordance with any example herein, and can be a laptop computer, a desktop computer, a tablet computer, a server, a gaming or entertainment control system, embedded computing device, or other electronic device.

System 500 includes storage subsystem 580 represents a nonvolatile storage device. In one example, controller 582 of storage subsystem 580 includes IMB control 590. IMB control 590 represents control for encryption of storage space, whether full encryption or partial encryption. In one example, storage subsystem 580 includes a self-encrypting drive. The control of the IMB space can be in accordance with any description herein, and includes storing a backup copy of the encrypted IMB data to prevent data loss in case of a subsequent PLI event during PLR. In one example, controller 582 can restore the encrypted IMB data which is valid, instead of the decrypted IMB data which is invalid. In one example, controller 582 will save the encrypted original or the decrypted space based on validity of the data. For example, if the unencrypted IMB is unlocked, the controller can record that data to nonvolatile memory, and otherwise record the encrypted copy of the data. In one example, system 500 includes PLI circuit 506 to detect PLI events in system 500. In one example, PLI circuit 506 can indicate the PLI event to controller 582.

System 500 includes processor 510 can include any type of microprocessor, central processing unit (CPU), graphics processing unit (GPU), processing core, or other processing hardware, or a combination, to provide processing or execution of instructions for system 500. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or a combination of such devices.

In one example, system 500 includes interface 512 coupled to processor 510, which can represent a higher speed interface or a high throughput interface for system components that need higher bandwidth connections, such as memory subsystem 520 or graphics interface components 540. Interface 512 represents an interface circuit, which can be a standalone component or integrated onto a processor die. Interface 512 can be integrated as a circuit onto the processor die or integrated as a component on a system on a chip. Where present, graphics interface 540 interfaces to graphics components for providing a visual display to a user of system 500. Graphics interface 540 can be a standalone component or integrated onto the processor die or system on a chip. In one example, graphics interface 540 can drive a high definition (HD) display that provides an output to a user. In one example, the display can include a touchscreen display. In one example, graphics interface 540 generates a display based on data stored in memory 530 or based on operations executed by processor 510 or both.

Memory subsystem 520 represents the main memory of system 500, and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510, such as integrated onto the processor die or a system on a chip.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 500 includes interface 514, which can be coupled to interface 512. Interface 514 can be a lower speed interface than interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can exchange data with a remote device, which can include sending data stored in memory or receiving data to be stored in memory.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (i.e., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (i.e., the value or state of the data is indeterminate if power is interrupted to system 500). In one example, storage subsystem 580 includes controller 582 to interface with storage 584. In one example controller 582 is a physical part of interface 514 or processor 510, or can include circuits or logic in both processor 510 and interface 514.

Power source 502 provides power to the components of system 500. More specifically, power source 502 typically interfaces to one or multiple power supplies 504 in system 500 to provide power to the components of system 500. In one example, power supply 504 includes an AC to DC (alternating current to direct current) adapter to plug into a wall outlet. Such AC power can be renewable energy (e.g., solar power) power source 502. In one example, power source 502 includes a DC power source, such as an external AC to DC converter. In one example, power source 502 or power supply 504 includes wireless charging hardware to charge via proximity to a charging field. In one example, power source 502 can include an internal battery or fuel cell source.

Figure 6:
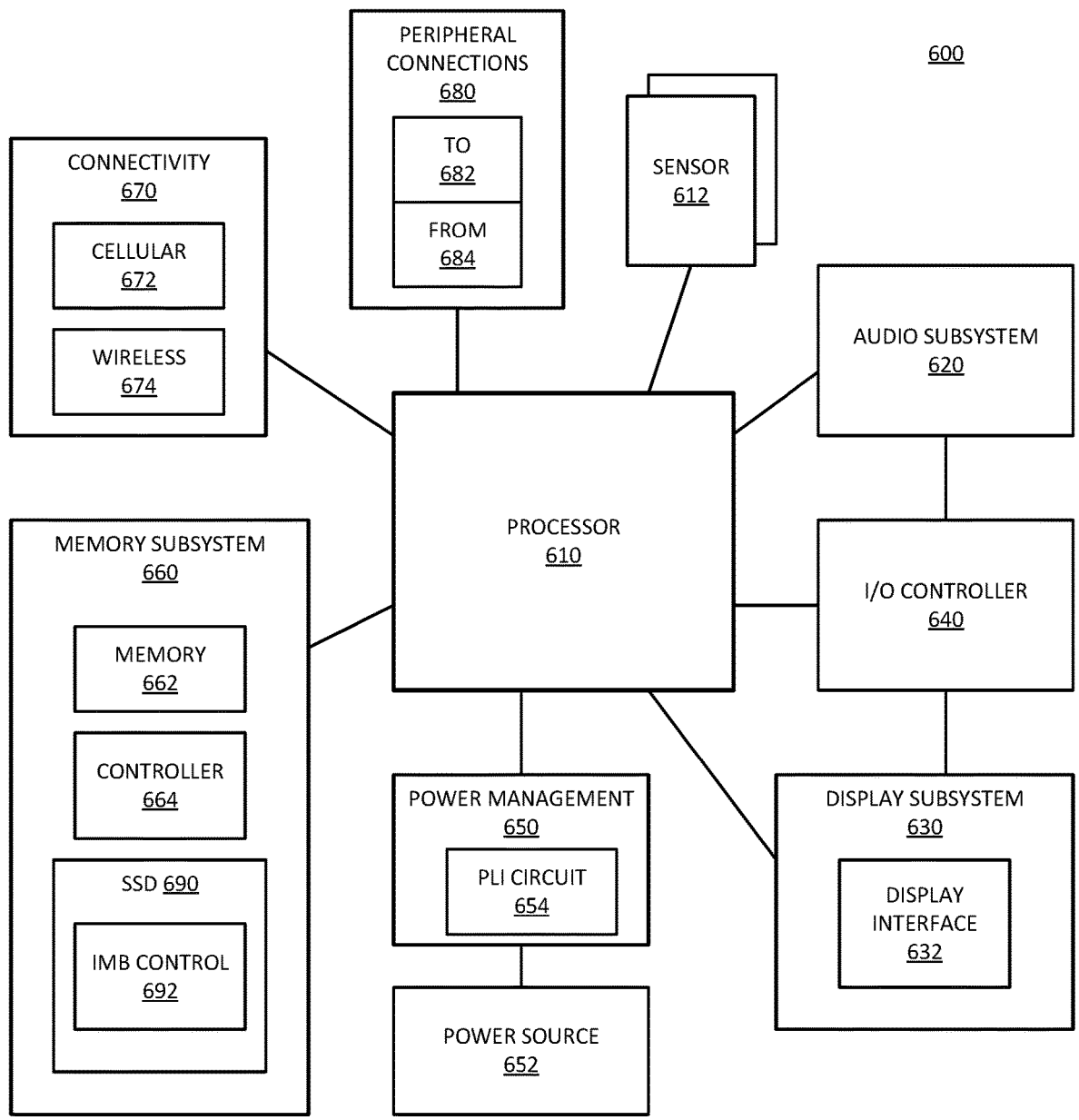
FIG. 6 is a block diagram of an example of a mobile device with a solid state drive with a backup integrated memory buffer can be implemented.

FIG. 6 is a block diagram of an example of a mobile device with a solid state drive with a backup integrated memory buffer can be implemented. System 600 represents a mobile computing device, such as a computing tablet, a mobile phone or smartphone, wearable computing device, or other mobile device, or an embedded computing device. It will be understood that certain of the components are shown generally, and not all components of such a device are shown in system 600.

System 600 includes memory subsystem 660 with SSD 690, which represents a nonvolatile storage device in accordance with any example herein. In one example, SSD 690 includes IMB control 692. IMB control 692 represents control for encryption of storage space, whether full encryption or partial encryption. In one example, SSD 690 is a self-encrypting drive. The control of the IMB space can be in accordance with any description herein, and includes storing a backup copy of the encrypted IMB data to prevent data loss in case of a subsequent PLI event during PLR. In one example, SSD 690 can restore the encrypted IMB data which is valid, instead of the decrypted IMB data which is invalid. In one example, SSD 690 saves the encrypted original or the decrypted space based on validity of the data. For example, if the unencrypted IMB is unlocked, the controller can record that data to nonvolatile memory, and otherwise record the encrypted copy of the data. In one example, system 600 includes PLI circuit 654 in power management 650 to detect PLI events in system 600. In one example, PLI circuit 654 can indicate the PLI event to SSD 690.

System 600 includes processor 610, which performs the primary processing operations of system 600. Processor 610 can include one or more physical devices, such as microprocessors, application processors, microcontrollers, programmable logic devices, or other processing means. The processing operations performed by processor 610 include the execution of an operating platform or operating system on which applications and device functions are executed. The processing operations include operations related to I/O (input/output) with a human user or with other devices, operations related to power management, operations related to connecting system 600 to another device, or a combination. The processing operations can also include operations related to audio I/O, display I/O, or other interfacing, or a combination. Processor 610 can execute data stored in memory. Processor 610 can write or edit data stored in memory.

In one example, system 600 includes one or more sensors 612. Sensors 612 represent embedded sensors or interfaces to external sensors, or a combination. Sensors 612 enable system 600 to monitor or detect one or more conditions of an environment or a device in which system 600 is implemented. Sensors 612 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 612 can also include sensors for biometric systems such as fingerprint recognition systems, face detection or recognition systems, or other systems that detect or recognize user features. Sensors 612 should be understood broadly, and not limiting on the many different types of sensors that could be implemented with system 600. In one example, one or more sensors 612 couples to processor 610 via a frontend circuit integrated with processor 610. In one example, one or more sensors 612 couples to processor 610 via another component of system 600.

In one example, system 600 includes audio subsystem 620, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 600, or connected to system 600. In one example, a user interacts with system 600 by providing audio commands that are received and processed by processor 610.

Display subsystem 630 represents hardware (e.g., display devices) and software components (e.g., drivers) that provide a visual display for presentation to a user. In one example, the display includes tactile components or touchscreen elements for a user to interact with the computing device. Display subsystem 630 includes display interface 632, which includes the particular screen or hardware device used to provide a display to a user. In one example, display interface 632 includes logic separate from processor 610 (such as a graphics processor) to perform at least some processing related to the display. In one example, display subsystem 630 includes a touchscreen device that provides both output and input to a user. In one example, display subsystem 630 includes a high definition (HD) or ultra-high definition (UHD) display that provides an output to a user. In one example, display subsystem includes or drives a touchscreen display. In one example, display subsystem 630 generates display information based on data stored in memory or based on operations executed by processor 610 or both.

I/O controller 640 represents hardware devices and software components related to interaction with a user. I/O controller 640 can operate to manage hardware that is part of audio subsystem 620, or display subsystem 630, or both. Additionally, I/O controller 640 illustrates a connection point for additional devices that connect to system 600 through which a user might interact with the system. For example, devices that can be attached to system 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 or display subsystem 630 or both. For example, input through a microphone or other audio device can provide input or commands for one or more applications or functions of system 600. Additionally, audio output can be provided instead of or in addition to display output. In another example, if display subsystem includes a touchscreen, the display device also acts as an input device, which can be at least partially managed by I/O controller 640. There can also be additional buttons or switches on system 600 to provide I/O functions managed by I/O controller 640.

In one example, I/O controller 640 manages devices such as accelerometers, cameras, light sensors or other environmental sensors, gyroscopes, global positioning system (GPS), or other hardware that can be included in system 600, or sensors 612. The input can be part of direct user interaction, as well as providing environmental input to the system to influence its operations (such as filtering for noise, adjusting displays for brightness detection, applying a flash for a camera, or other features).

In one example, system 600 includes power management 650 that manages battery power usage, charging of the battery, and features related to power saving operation. Power management 650 manages power from power source 652, which provides power to the components of system 600. In one example, power source 652 includes an AC to DC (alternating current to direct current) adapter to plug into a wall outlet. Such AC power can be renewable energy (e.g., solar power, motion based power). In one example, power source 652 includes only DC power, which can be provided by a DC power source, such as an external AC to DC converter. In one example, power source 652 includes wireless charging hardware to charge via proximity to a charging field. In one example, power source 652 can include an internal battery or fuel cell source.

Memory subsystem 660 includes memory device(s) 662 for storing information in system 600. Memory subsystem 660 can include nonvolatile (state does not change if power to the memory device is interrupted) or volatile (state is indeterminate if power to the memory device is interrupted)

memory devices, or a combination. Memory 660 can store application data, user data, music, photos, documents, or other data, as well as system data (whether long-term or temporary) related to the execution of the applications and functions of system 600. In one example, memory subsystem 660 includes memory controller 664 (which could also be considered part of the control of system 600, and could potentially be considered part of processor 610). Memory controller 664 includes a scheduler to generate and issue commands to control access to memory device 662.

Connectivity 670 includes hardware devices (e.g., wireless or wired connectors and communication hardware, or a combination of wired and wireless hardware) and software components (e.g., drivers, protocol stacks) to enable system 600 to communicate with external devices. The external device could be separate devices, such as other computing devices, wireless access points or base stations, as well as peripherals such as headsets, printers, or other devices. In one example, system 600 exchanges data with an external device for storage in memory or for display on a display device. The exchanged data can include data to be stored in memory, or data already stored in memory, to read, write, or edit data.

Connectivity 670 can include multiple different types of connectivity. To generalize, system 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 680 include hardware interfaces and connectors, as well as software components (e.g., drivers, protocol stacks) to make peripheral connections. It will be understood that system 600 could both be a peripheral device ("to" 682) to other computing devices, as well as have peripheral devices ("from" 684) connected to it. Device 600 commonly has a "docking" connector to connect to other computing devices for purposes such as managing (e.g., downloading, uploading, changing, synchronizing) content on system 600. Additionally, a docking connector can allow system 600 to connect to certain peripherals that allow system 600 to control content output, for example, to audiovisual or other systems.

In addition to a proprietary docking connector or other proprietary connection hardware, system 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, in one example an apparatus for data storage includes: a nonvolatile memory array including an encrypted integrated memory buffer (IMB); a cache memory including a decrypted copy of the IMB and an encrypted backup copy of the IMB; and power loss imminent (PLI) control to trigger soft shutdown in response to detection of a PLI event; wherein in recovery after PLI shutdown, the apparatus is to determine whether to restore the decrypted copy of the IMB or the encrypted backup copy of the IMB.

In one example, the cache memory comprises volatile storage media. In one example, the cache memory comprises nonvolatile storage media. In one example, the nonvolatile memory array comprises a multilevel cell (MLC) flash memory and the cache memory comprises a single level cell (SLC) flash memory. In one example, the apparatus further includes a controller capable to implement self-encrypting drive (SED) operations. In one example, recovery after PLI shutdown comprises the controller to implement a power loss recovery (PLR) routine, wherein the controller is to determine validity of the decrypted copy of the IMB. In one example, to determine validity of the decrypted copy of the IMB comprises reading an unlock flag in PLR metadata for the IMB. In one example, the controller comprises an OPAL-enabled controller, to implement an OPAL protocol of the TRUSTED COMPUTING GROUP (TCG).

In general with respect to the descriptions herein, in one example a computing device with data storage includes: a host processor to execute a host operating system; a solid state drive (SSD) coupled to the host processor, the SSD including: a nonvolatile memory array including an encrypted integrated memory buffer (IMB); a cache memory including a decrypted copy of the IMB and an encrypted backup copy of the IMB; and power loss imminent (PLI) control to trigger soft shutdown in response to detection of a PLI event, wherein in recovery after PLI shutdown, the SSD is to determine whether to restore the decrypted copy of the IMB or the encrypted backup copy of the IMB.

In one example, the cache memory comprises volatile storage media. In one example, the cache memory comprises nonvolatile storage media. In one example, the SSD further includes a controller capable to implement self-encrypting drive (SED) operations. In one example, recovery after PLI shutdown comprises the controller to implement a power loss recovery (PLR) routine, wherein the controller is to determine validity of the decrypted copy of the IMB. In one example, to determine validity of the decrypted copy of the IMB comprises reading an unlock flag in PLR metadata for the IMB. In one example, the host processor device includes a multi-core processor. In one example, the system further includes a display communicatively coupled to the host processor. In one example, the system further includes a network interface communicatively coupled to the host processor. In one example, the system further includes a battery to power the computing device.

In general with respect to the descriptions herein, in one example a method includes: identifying a power loss imminent (PLI) event; determining if a decrypted copy of an integrated memory buffer (IMB) stored in a memory buffer of a solid state drive (SSD) or an encrypted copy of the IMB stored in the memory buffer is valid; and saving the decrypted copy of the IMB to a nonvolatile memory array of the SSD if the decrypted copy of the IMB is valid; otherwise, saving the encrypted copy of the IMB to the nonvolatile memory array if the encrypted copy of the IMB is valid.

In one example, the cache memory comprises volatile storage media. In one example, determining validity of the decrypted copy and the encrypted copy comprises making a determination of which copy is valid in a self-encrypting drive (SED). In one example, making the determination comprises executing a power low recovery (PLR) routine. In one example, making the determination comprises reading an unlock flag in power loss recovery (PLR) metadata for the IMB.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus for data storage, comprising:
   a nonvolatile memory array including an encrypted integrated memory buffer (IMB);
   a cache memory including a decrypted copy of the IMB and an encrypted backup copy of the IMB; and
   power loss imminent (PLI) control to trigger soft shutdown in response to detection of a PLI event;
   wherein in recovery after PLI shutdown, the apparatus is to determine whether to restore the decrypted copy of the IMB or the encrypted backup copy of the IMB.

2. The apparatus of claim 1, wherein the cache memory comprises volatile storage media.

3. The apparatus of claim 1, wherein the cache memory comprises nonvolatile storage media.

4. The apparatus of claim 3, wherein the nonvolatile memory array comprises a multilevel cell (MLC) flash memory and the cache memory comprises a single level cell (SLC) flash memory.

5. The apparatus of claim 1, further comprising a controller capable to implement self-encrypting drive (SED) operations.

6. The apparatus of claim 5, wherein recovery after PLI shutdown comprises the controller to implement a power loss recovery (PLR) routine, wherein the controller is to determine validity of the decrypted copy of the IMB.

7. The apparatus of claim 6, wherein to determine validity of the decrypted copy of the IMB comprises reading an unlock flag in PLR metadata for the IMB.

8. The apparatus of claim 5, wherein the controller comprises an OPAL-enabled controller, to implement an OPAL protocol of the TRUSTED COMPUTING GROUP (TCG).

9. A computing device with data storage, comprising:
   a host processor to execute a host operating system;
   a solid state drive (SSD) coupled to the host processor, the SSD including:
      a nonvolatile memory array including an encrypted integrated memory buffer (IMB);
      a cache memory including a decrypted copy of the IMB and an encrypted backup copy of the IMB; and
      power loss imminent (PLI) control to trigger soft shutdown in response to detection of a PLI event, wherein in recovery after PLI shutdown, the SSD is to determine whether to restore the decrypted copy of the IMB or the encrypted backup copy of the IMB.

10. The computing device of claim 9, wherein the cache memory comprises volatile storage media.

11. The computing device of claim 9, wherein the cache memory comprises nonvolatile storage media.

12. The computing device of claim 9, the SSD further comprising a controller capable to implement self-encrypting drive (SED) operations.

13. The computing device of claim 12, wherein recovery after PLI shutdown comprises the controller to implement a power loss recovery (PLR) routine, wherein the controller is to determine validity of the decrypted copy of the IMB.

14. The computing device of claim 13, wherein to determine validity of the decrypted copy of the IMB comprises reading an unlock flag in PLR metadata for the IMB.

15. The computing device of claim 9,
   wherein the host processor includes a multi-core processor;
   further comprising a display communicatively coupled to the host processor;
   further comprising a network interface communicatively coupled to the host processor; or
   further comprising a battery to power the computing device.

16. A method comprising:
   identifying a power loss imminent (PLI) event;
   determining if a decrypted copy of an integrated memory buffer (IMB) stored in a memory buffer of a solid state drive (SSD) or an encrypted copy of the IMB stored in the memory buffer is valid; and saving the decrypted copy of the IMB to a nonvolatile memory array of the SSD if the decrypted copy of the IMB is valid; otherwise, saving the encrypted copy of the IMB to the nonvolatile memory array if the encrypted copy of the IMB is valid.

17. The method of claim 16, wherein the memory buffer comprises volatile storage media.

18. The method of claim 16, wherein determining validity of the decrypted copy and the encrypted copy comprises making a determination of which copy is valid in a self-encrypting drive (SED).

19. The method of claim 18, wherein making the determination comprises executing a power low recovery (PLR) routine.

20. The method of claim 18, wherein making the determination comprises reading an unlock flag in power loss recovery (PLR) metadata for the IMB.

\* \* \* \* \*